(12) United States Patent
Azar

(10) Patent No.: US 6,450,184 B1
(45) Date of Patent: Sep. 17, 2002

(54) APPARATUS FOR MEASURING CAVITATION ENERGY PROFILES

(76) Inventor: Lawrence Azar, 236 Stanford S/C #236, Palo Alto, CA (US) 94304

( * ) Notice: Subject to any disclaimer, the term of this patent is extended or adjusted under 35 U.S.C. 154(b) by 0 days.

(21) Appl. No.: 09/498,571

(22) Filed: Feb. 4, 2000

(51) Int. Cl.⁷ .................................................. B08B 3/10
(52) U.S. Cl. ................... 134/57 R; 134/58 R; 134/184; 134/113; 134/902; 73/570
(58) Field of Search .............................. 134/56 R, 57 R, 134/58 R, 402, 184, 186, 113; 73/1.82, 570, 571, 584, 618; 310/316.01, 316.02

(56) References Cited

U.S. PATENT DOCUMENTS

| | | | |
|---|---|---|---|
| 4,081,706 A | * | 3/1978 | Edelson |
| 4,099,417 A | * | 7/1978 | Shwartzman |
| 4,510,810 A | * | 4/1985 | Kanada et al. |
| 4,703,633 A | * | 11/1987 | Boscolo et al. |
| 4,864,547 A | * | 9/1989 | Ksrna |
| 5,276,376 A | * | 1/1994 | Puskas |
| 5,305,642 A | * | 4/1994 | Pipper et al. |
| 5,305,737 A | * | 4/1994 | Vago |
| 5,433,102 A | * | 7/1995 | Pedziwiatr |
| 5,496,411 A | * | 3/1996 | Candy |
| 5,676,015 A | * | 10/1997 | Sheen et al. |
| 5,931,173 A | * | 8/1999 | Schiele |
| 6,138,698 A | * | 10/2000 | Tanaka et al. |
| 6,189,574 B1 | * | 2/2001 | Miyamoto et al. |
| 6,242,847 B1 | * | 6/2001 | Puskas |

FOREIGN PATENT DOCUMENTS

JP  4-561132  * 2/1992

* cited by examiner

Primary Examiner—Frankie L. Stinson
(74) Attorney, Agent, or Firm—Peninsula IP Group; Douglas A. Chaikin; D. A. Marshall

(57) ABSTRACT

An apparatus and method for measuring cavitation energy of a device placed in a cleaning bath tank of ultrasonic and megasonic cleaning systems. Probe apparatus having an array of probes positioned within the bath detects formation of bubbles at various locations within the bath that are generated by ultrasonic and megasonic vibrations applied to the bath with each probe of the array generating an electrical waveform in response to the detection of the bubbles. Apparatus coupled to each probe of the probe array analyzes the probe-generated voltages and determines cavitation energy profiles occurring on surfaces of a device located in the bath.

7 Claims, 5 Drawing Sheets

APPARATUS FOR MEASURING CAVITATION ENERGY PROFILES

BACKGROUND OF THE INVENTION

1. Technical Field

The invention relates to apparatus and method for measuring cavitation energy profiles on devices placed in ultrasonic and megasonic cleaning systems.

2. Field of the Invention

Ultrasonic and megasonic cleaning systems are well known and are used in a wide variety of applications to clean various types of devices. Typically, a cleaning system has a tank with a cleaning bath that may consist of water with a cleaning material such as a detergent recommended and selected for use in cleaning particular types of devices. Ultrasonic and megasonic systems, sometimes referred to as agitation systems, have a transducer designed to generate high frequency vibrations in the cleaning tank in response to an electric input top the transducer. An ultrasonic cleaning system may operate in a range of 20 kHz to 400 kHz while a megasonic system may operate in a range of 500 kHz to 3 MHz.

In operation, the transducer vibrations are introduced into the cleaning tank containing the bath and the device or devices to be cleaned. The introduced vibrations generate pressure gradients within the bath, which form cavitation bubbles in low-pressure areas. The bubbles begin to grow until entering a high-pressure region and then collapse against a surface of the device to be cleaned thereby dislodging contaminants. The implosion of the bubbles creates a strong force over a period of time to clean devices such as memory disks, semiconductor wafers, LCD and other like devices.

Ultrasonic energy is a series of pressure points, or rather a series of compression and rarefaction. If the energy is of sufficient intensity, the cleaning liquid of the bath will actually be pulled apart and small bubbles or cavities will be formed. The bubbles collapse or implode throughout the cleaning fluid creating an effective force, which is uniquely suited to cleaning. This process is known as cavitation. Although the energy released from a single cavitation bubble is extremely small, the collapse of millions of bubbles produces an intense scrubbing action of the surface of the device to be cleaned. In many cleaning processes the control of cavitation energy is one of the most critical parameters affecting product yield. A problem arises in that if not enough energy is present on a surface location, the device will not be cleaned. Another problem arises in that if too much energy is present in one location the excessive force may damage the device being cleaned. One method of measuring cavitation is an indirect method that consists of exposing aluminum foil to the cavitation process and then examining the foil for dents and holes caused by the cavitation process. The current technology is limited to the measurement of the ultrasonic sound waves energy by the use of instructions called hydrophones. A problem with hydrophones systems arises in that they are limited to detecting only very low frequencies typically in the range of 40 kHz to 68 kHz. Thus, hydrophone systems act as a low-pass filter, which automatically filters out and removes the higher frequency cavitation energy. Neither of these methods measure the cavitation process at various locations within the cleaning bath. Accordingly, a need exists in the art for apparatus and a method for actively measuring the cavitation process at various locations in the cleaning bath during operation of removing contaminants from devices placed in the bath.

SUMMARY OF THE INVENTION

Apparatus solves the foregoing problem by measuring the cavitation process at various locations in a cleaning bath during ultrasonic and megasonic sonic cleaning of devices placed in the cleaning bath.

It is an object of this invention to provide apparatus for measuring the cavitation activity occurring in various locations in an ultrasonic and megasonic cleaning bath and for generating a profile of the cavitation process occurring at various locations on the surface of a device resident in the cleaning bath.

It is also an additional object of this invention to provide probe apparatus having a plurality of probe sensors for measuring cavitation energy appearing at various locations in an ultrasonic and megasonic cleaning bath.

It is also an additional object of this invention to provide apparatus coupled to each probe of the probe array immersed in an ultrasonic and megasonic cleaning bath for analyzing the voltage waveform generated by each probe and determining a cavitation energy profile occurring on surfaces of a device located in the bath.

In the preferred embodiment of the invention apparatus for measuring cavitation energy of a bath resident in a tank of ultrasonic and megasonic cleaning systems has probe apparatus having an array of probes positioned within the bath for detecting the pressure formed by the collapse of bubbles at various locations within the bath that are generated by ultrasonic and megasonic vibrations applied to the bath and with each probe of the array generating an electrical waveform in response to the detection of the bubbles. Apparatus coupled to each probe of the probe array analyzes the voltage generated each probe and determines a cavitation energy profile occurring on surfaces of a device located in the bath.

BRIEF DESCRIPTION OF THE DRAWING

For a further understanding of the objects and advantages of the present invention, reference should be had to the following detailed description, taken in conjunction with the accompanying drawing, in which like parts are given like reference in numerals and wherein.

DETAILED DESCRIPTION

Figure 1:
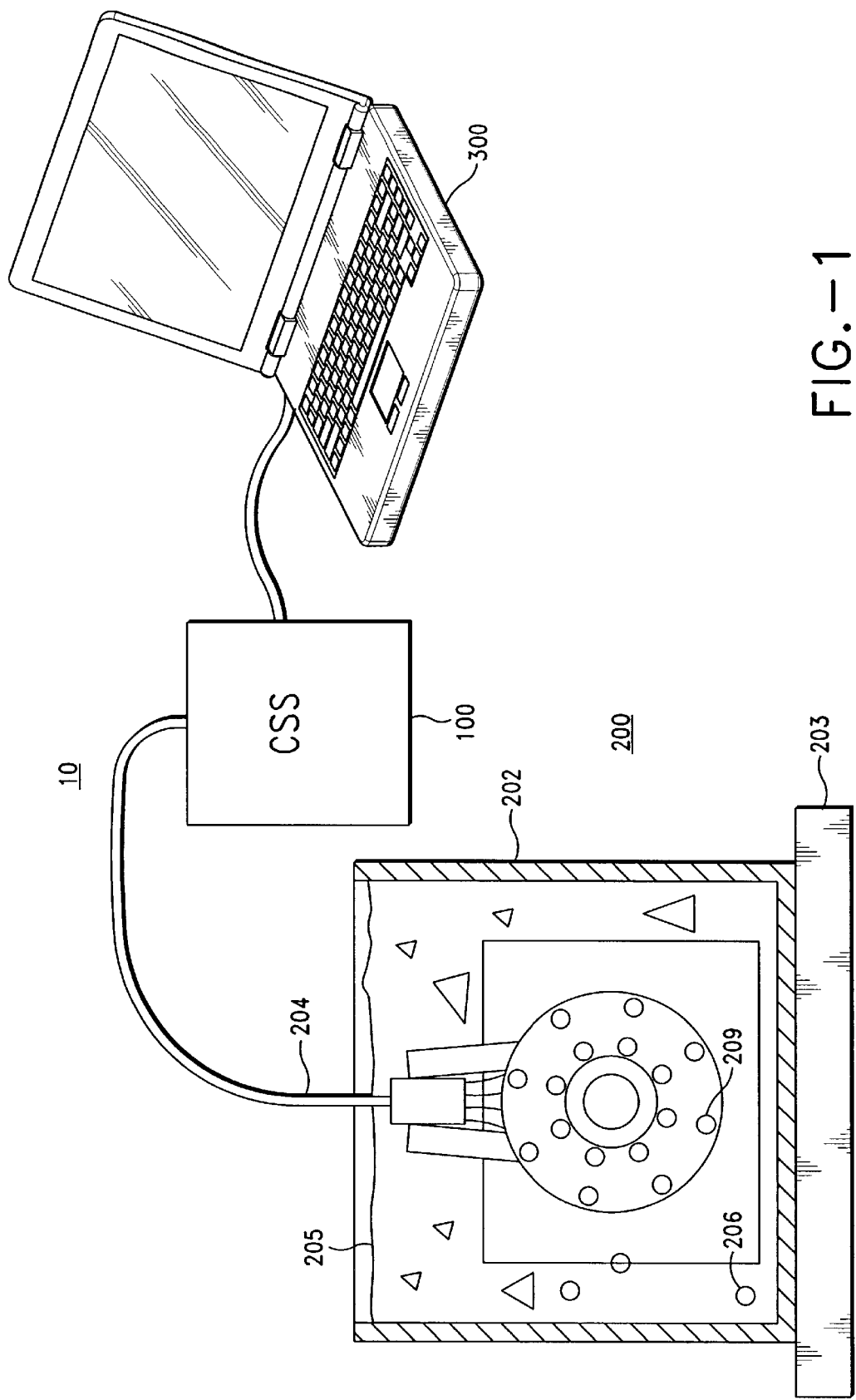
FIG. 1 is a view of an ultrasonic and megasonic cleaning system having apparatus for actively and continuously measuring profiles of a cavitation processes on devices being cleaning in the ultrasonic and megasonic cleaning bath in accordance with principles of the invention.

System 10 set forth in FIG. 1 of the drawing may be either an ultrasonic or megasonic system for use in cleaning a device 207 in accordance with principles of the invention and having cleaning apparatus 200 consisting of a tank 202 associated with a transducer 201. The tank 202 contains a cleaning solution 205, typically, although not limited thereto, which may be water having a detergent suitability recommended for cleaning devices 207 which may be memory disks, semiconductors, LCDs or other similar devices. In operation, device 207 is placed in the cleaning bath and transducer 201 enabled to generate transducer vibrations of a value in a selected range of 20 kHz to 400 kHz for an ultrasonic cleaning system and of 500 kHz to 3 MHz for a megasonic cleaning system and to introduce the vibrations into the cleaning tank 202. In a typical example, for example, cleaning memory disks, the disks are cleaned in a cassette of disks wherein all of the disks sit side by side with only a few millimeters between them in the tank 202. The introduced vibrations generate pressure gradients within the bath 205, which form cavitation bubbles, such as bubbles 206 in low-pressure areas. The bubbles begin to grow until entering a high-pressure region and then collapse against a surface of device 207 thereby dislodging contaminants.

Figure 2:
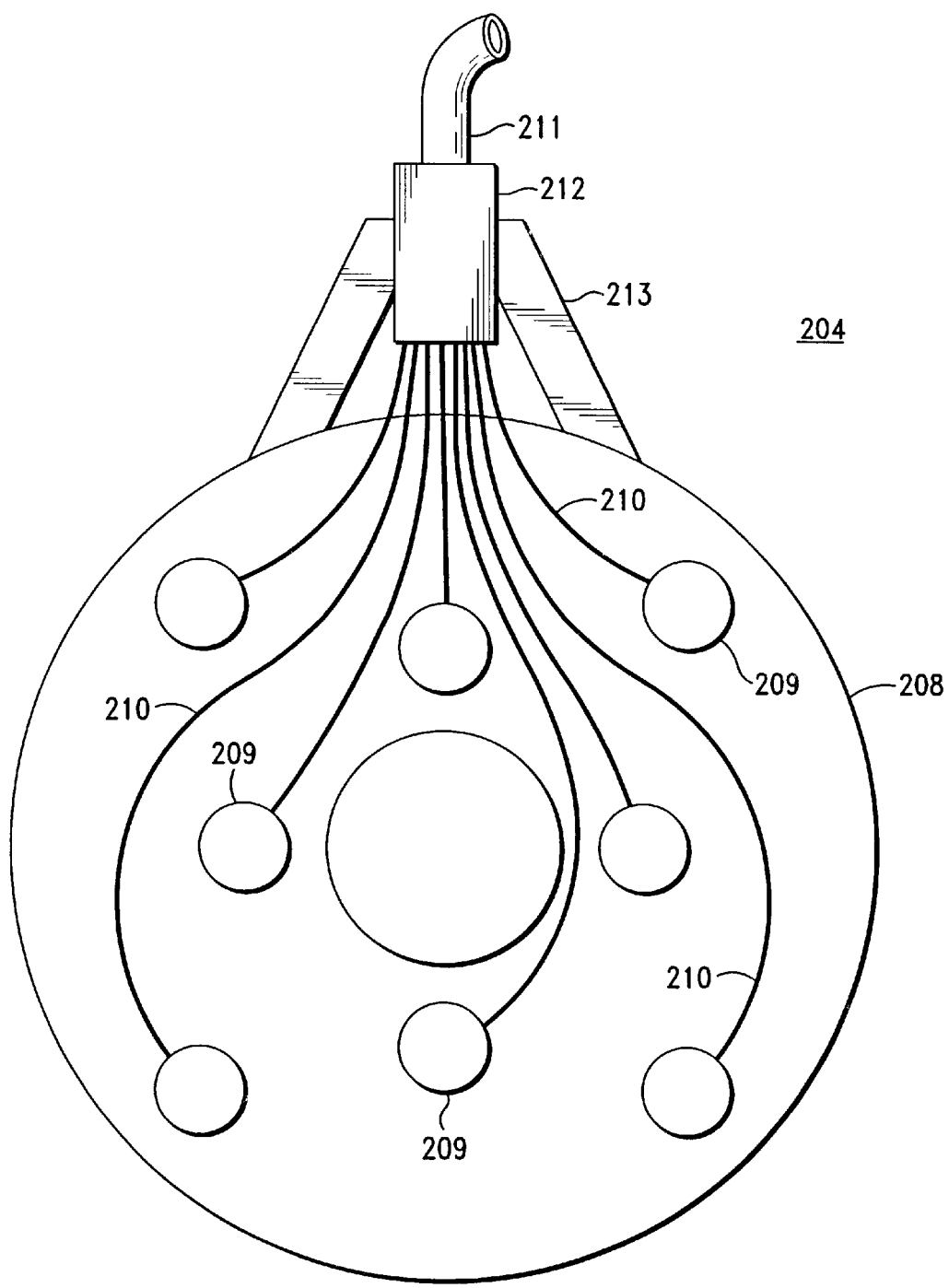
FIG. 2 is a view of a probe apparatus in FIG. 1 for measuring profiles of an ultrasonic and megasonic cavitation process.

Probe apparatus 204, FIG. 2, may be a quartz disk 208 having a plurality of sensors 209 mounted on an inside surface of the disk 208. Various configurations of the sensors 209 may be positioned at various positions on the quartz disk 208 at the option of the user. The quartz disk 208 functions as quartz lens for interfacing the probe apparatus 204 with the cavitation process occurring in the cleaning system tank 202. Each of the sensors 209 is a piezoelectric device formed of piezoelectric material affixed to the inside surface of the quartz lens disk 208 at the predetermined locations. The sensors 209 may vary in number and location of the quartz lens disk 208 and each sensor 209 is responsive to the cavitation energy occurring in the bath at the location of the sensor 209 for generating an electrical waveform in response to the cavitation energy occurring at the sensor 209 location in the cleaning bath 205. Although only eight sensors 209 are shown in FIG. 2, it is to be understood that they are only representative to show typical probe apparatus 204 and various numbers and positions of sensors 209 may be used in accordance with the invention depending upon the types of devices to be cleaned.

Figure 3:
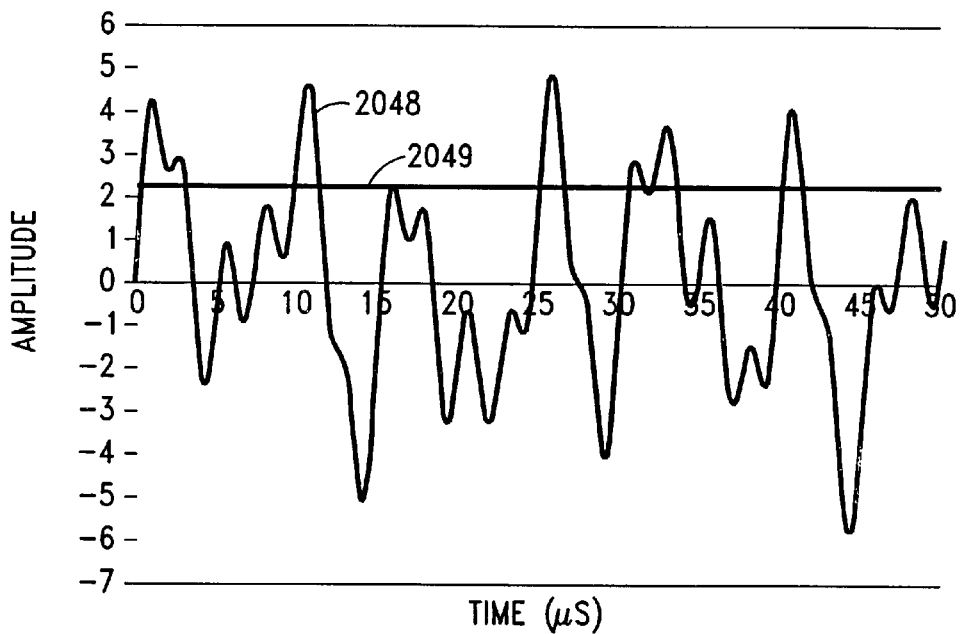
FIG. 3 is an typical waveform generated by a probe of the probe apparatus of FIGS. 1 and 2 in response to a cavitation process occurring in the cleaning bath.

A support structure of a generally circular hollow member 212 attached to quartz lens disk 208 by members 213 supports the probe apparatus quartz lens 208 and the plurality of sensors 209 affixed thereto in the cleaning bath tank 202 adjacent the devices 207 to be cleaned. A waterproof housing is formed and mounted on a side of the quartz lends disk 208 adjacent the plurality of sensors 206 forming a water tight seal around an edge of the quartz lens disk 208 while interfacing the quartz lens disk 208 with the cavitation energy occurring in the cleaning bath 205. A plurality of wires 210 conductors of cable 211 extending from cavitation sensor system 100, FIG. 1, and terminated in hollow member 212, FIG. 2, are located in the hollow member 212 with one of wires 210 forming a common ground lead for all of the piezoelectric sensors 209. Each of the other wires 210 are individually attached to one of the piezoelectric sensors 209 and interconnected to each of the piezoelectric sensors 209 with analyzing apparatus of cavitation sensor system 100. A pair of contact elements are affixed to each piezoelectric sensor 209 to connect the common ground lead and one of the other wires 210 to the piezoelectric sensor 209. In operation, probe apparatus 204 generates an electrical waveform 2048, FIG. 3 at each location of a probe sensor 209 in cleaning bath 205 characterizing the specific cavitation energy occurring at the sensor location. The electrical waveform 2048 is a combination of the transducer induced vibration energy superimposed on the cavitation energy occurring at the location of the probe sensor 209.

Figure 4:
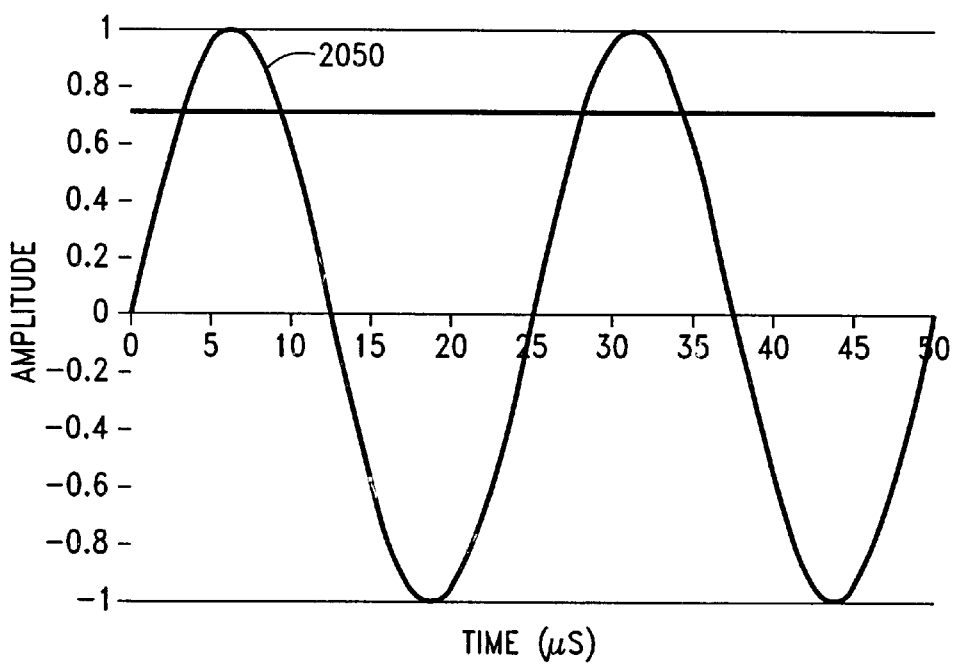
FIG. 4 is a waveform of the ultrasonic and megasonic generated by the transducer of FIG. 1 and applied to the cleaning bath.

Cavitation sensor system 100, FIG. 1 is coupled to each probe 206 of the probe array apparatus 204 and analyzes the ultrasonic and megasonic frequency induced in the cleaning bath 205 by transducer 201 and the probe generated electrical waveforms to determine a cavitation energy profile occurring on the surfaces of a device 207 located in the cleaning bath 205. Each of the probe apparatus 204 wires 210, FIG. 2 in addition to the ground lead, form a channel individual to each sensor 209 and is connected, FIG. 1, to cavitation sensor system 100, FIG. 6. The electrical low-pass filter 101, connected to a wire 210 of probe sensor 209 and identified as channel 1, attenuates the cavitation energy frequencies in the input combined waveform 2408, FIG. 3, such that the output waveform 2050, FIG. 4 of low-pass filter 101 is essentially the ultrasonic and megasonic frequency generated by the transducer 201, FIG. 1. Upon receiving the sinusoidal waveform 2050 output of low-pass filter 101, FIG. 6 voltage comparator 105 converts sinusoidal waveform 2050 into a square wave of the same period and having a plus and minus value selected by user adjustment of voltage comparator 105. The square wave output of voltage comparator 105 is applied as input to frequency divider 106 wherein the frequency of the input wave is divided by a user selected multiple of two such as 128, 256 or the like. The output of frequency divider 106 is then applied to a frequency input of data acquisition board 301. Data acquisition board 301 may be any one of a number of commercially available circuit boards and serves to interconnect cavitation sensor system 100 with a digital computer or profile meter 300, FIG. 1. Thus, computer or profile meter 300 is enabled by data acquisition board 301, to display the frequency of the vibrations introduced into cleaning bath 205, FIG. 1 by transducer 201.

Figure 5:
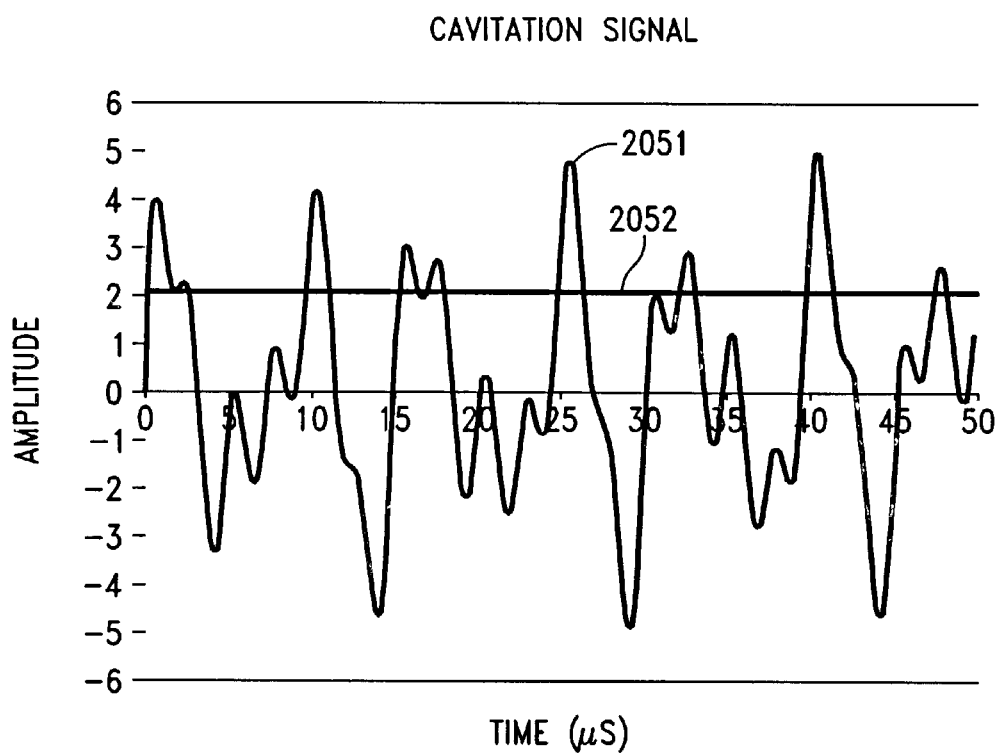
FIG. 5 is a typical waveform of the cavitation process energy occurring in the cleaning tank FIG. 1 as a result of ultrasonic and megasonic signals applied to the cleaning tank by the transducer of FIG. 1.

Each of filters 102 through 104 individually connected to a probe channel wire 201, has an output connected to a corresponding RMS to DC converter 107 through 109. RMS to DC converts 107 through 109 calculates the root-mean square (RMS) value 2051, FIG. 5, of the cavitation energy electrical RMS into a varying 2051 waveform detected by each probe sensor 209 and converts the calculated RMS into a varying DC voltage representative of the probe sensor detected cavitation energy input to the RMS to DC converter 117. The output of each RMS to DC converter 107 through 109 is connected to a corresponding channel input of the data acquisition board 301 so that the varying DC voltage appearing on each channel input is converted into digital information that can be displayed on computer or profile meter 300, FIG. 1.

Each of filters 102 through 104 individually connected to a probe channel wire 201, has an output connected to a corresponding RMS to DC converter 107 through 109. RMS to DC converts 107 through 109 calculates the root-mean square (RMS) value 2051, FIG. 5, of the cavitation energy electrical RMS into a varying 2051 waveform detected by each probe sensor 209 and converts the calculated RMS into a varying DC voltage 2052 representative of the probe sensor detected cavitation energy input to the RMS to DC converter 107. The output of each RMS to DC converter 107 through 109 is connected to a corresponding channel input of the data acquisition board 301 so that the varying DC voltage appearing on each channel input is converted into digital information that can be displayed on computer or profile meter 300, FIG. 1.

The channel information is the characteristic of the cavitation energy occurring in the cleaning bath 205 at each probe sensor 209 location and thereby enables the computer or probe meter 300 to display the probe sensor characteristics as a profile of the cavitation energies appearing at surfaces of the devices being cleaned in cleaning bath 205.

Figure 6:
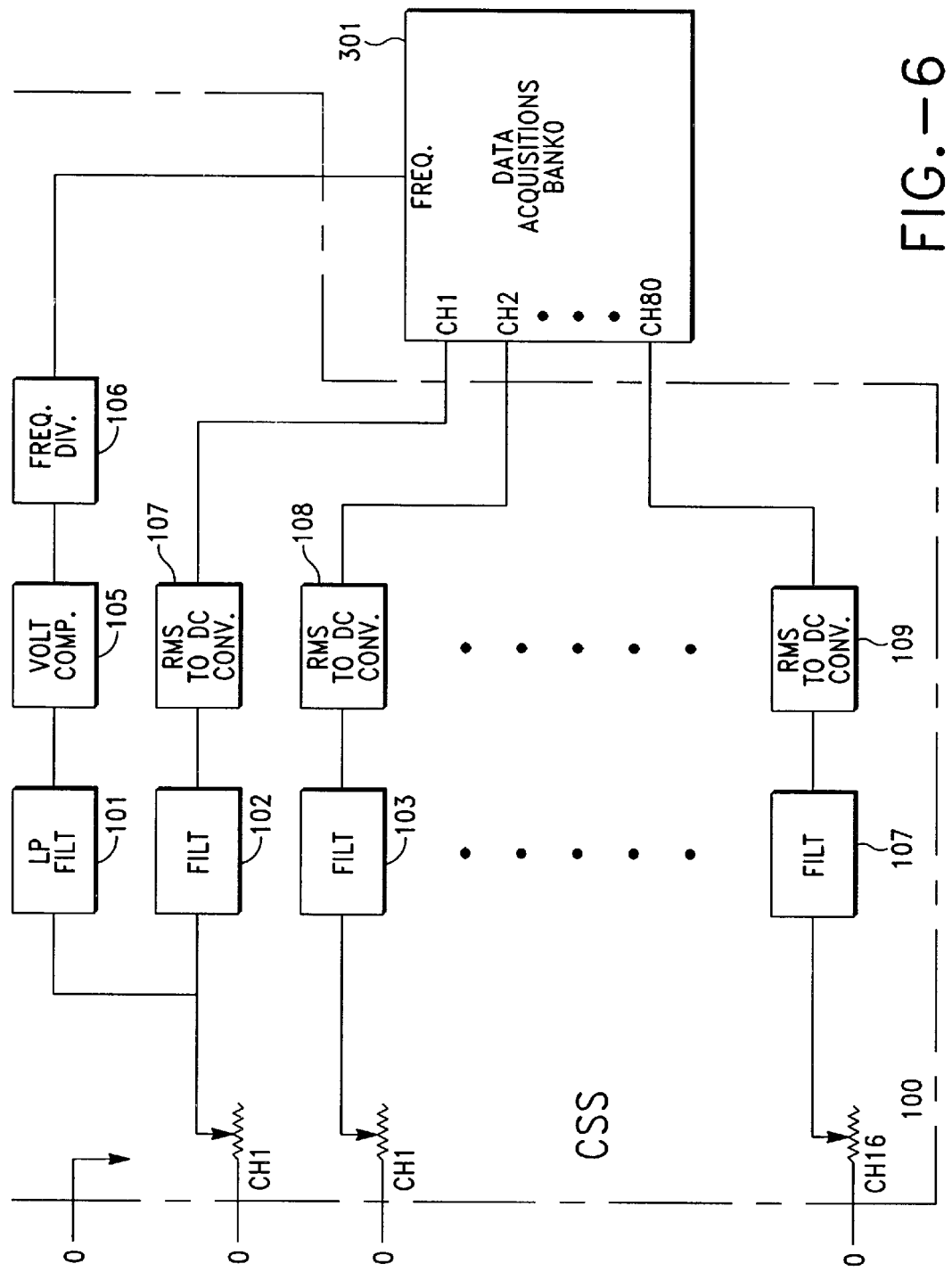
FIG. 6 is a block diagram of the apparatus of the cavitation sensor system set forth in FIG. 1.

The detailed logic circuitry of the circuit apparatus set forth in FIG. 6 of the drawing is performed by filters, voltage comparators, frequency dividers, digital acquisition cards, computer and the like, the operation of which are well known in the art and the details of which need not be disclosed for an understanding of the invention. Typical examples of the logic circuitry are described in numerous textbooks. For example, such types of logic circuitry, among others, are described by J. Millman and H. Taub in Pulse, Digital and Switching Waveforms, 1965, McGraw-Hall, Inc., H. Alex Romanowitz and Russell E. Pucket in Introduction of Electronics, 1968, John Wiley & Sons, Inc. and in the TTL Data Book of Design Engineers, Second Edition, 1976, Texas Instruments Incorporated.

It is obvious from the foregoing that the facility, economy and efficiently of ultrasonic and megasonic cleaning systems are improved by apparatus for profiling individual cavitation process occurring at surfaces of devices immersed in a cleaning bath of the cleaning system and for displaying a profile of the cavitation process on a monitor.

While the foregoing detailed description has described an embodiment of Invention having a specific configuration of probe sensors and monitors for displaying a profile of probe sensor cavitation energy it is to be understood that other configurations are within the scope and spirit of this invention. Thus, the invention is to be limited only by the claims set forth below.

What is claimed is:

1. Apparatus for measuring a cavitation energy of a bath resident in a tank of ultrasonic and megasonic cleaning system wherein said apparatus comprises a probe having an array of a configuration of sensors positioned within the bath for detecting pressures formed by the collapse of bubbles at various locations within the bath that are generated by ultrasonic and megasonic vibrations applied to the bath and apparatus coupled to each sensor of the probe for analyzing the probe generated voltages and determining a cavitation energy profile occurring on surfaces of a device located in the bath.

2. The measuring apparatus set forth in claim 1 wherein the probe comprises a quartz lens for interfacing the probe with a cavitation process occurring in the cleaning system tank.

3. The measuring apparatus set forth in claim 2 wherein the probe comprises a plurality of piezoelectric devices affixed to the quartz lens as sensors at predetermined locations and each device responsive to the cavitation energy occurring in the bath at the device for generating an electrical waveform in response thereto.

4. The measuring apparatus set forth in claim 3 wherein the probe comprises a support structure formed of a hollow tube for supporting the probe quartz lens and piezoelectric devices affixed thereto in the cleaning bath tank adjacent the device.

5. The measuring apparatus set forth in claim 4 wherein the probe comprises a head structure of a waterproof housing mounted on a side of the quartz lens adjacent the plurality of piezoelectric devices forming a water tight seal around an edge of the quartz lens while interfacing the quartz lens with the cavitation energy occurring in the bath.

6. The measuring apparatus set forth in claim 4 wherein the probe comprises a plurality of wires located in the hollow tube with one wire forming a common ground lead for all of the piezoelectric devices and each of the other wires attached to one of the piezoelectric devices for interconnecting each of the piezoelectric devices with the analyzing apparatus.

7. The measuring apparatus set forth in claim 6 wherein the probe comprises a pair of contact elements affixed to the piezoelectric device each for connecting the common ground lead and one of the other wires to the piezoelectric device.

* * * * *